Figure 1:
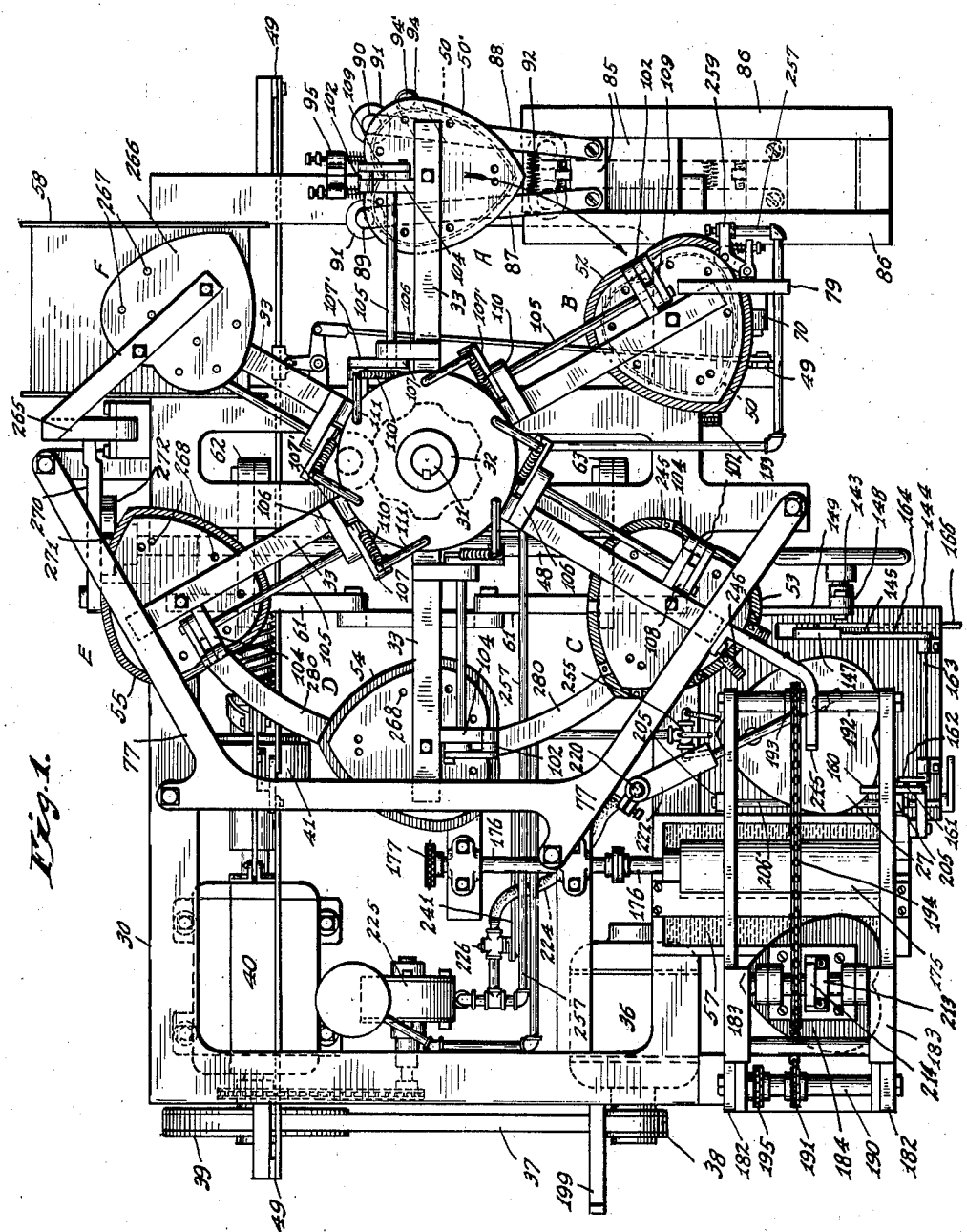

April 29, 1941.   J. B. THAXTON   2,240,445
BOX FORMING MACHINE
Filed April 10, 1939   6 Sheets-Sheet 1

INVENTOR.
JAMES BOYD THAXTON,
BY
ATTORNEYS.

April 29, 1941.　　　J. B. THAXTON　　　2,240,445
BOX FORMING MACHINE
Filed April 10, 1939　　　6 Sheets-Sheet 2
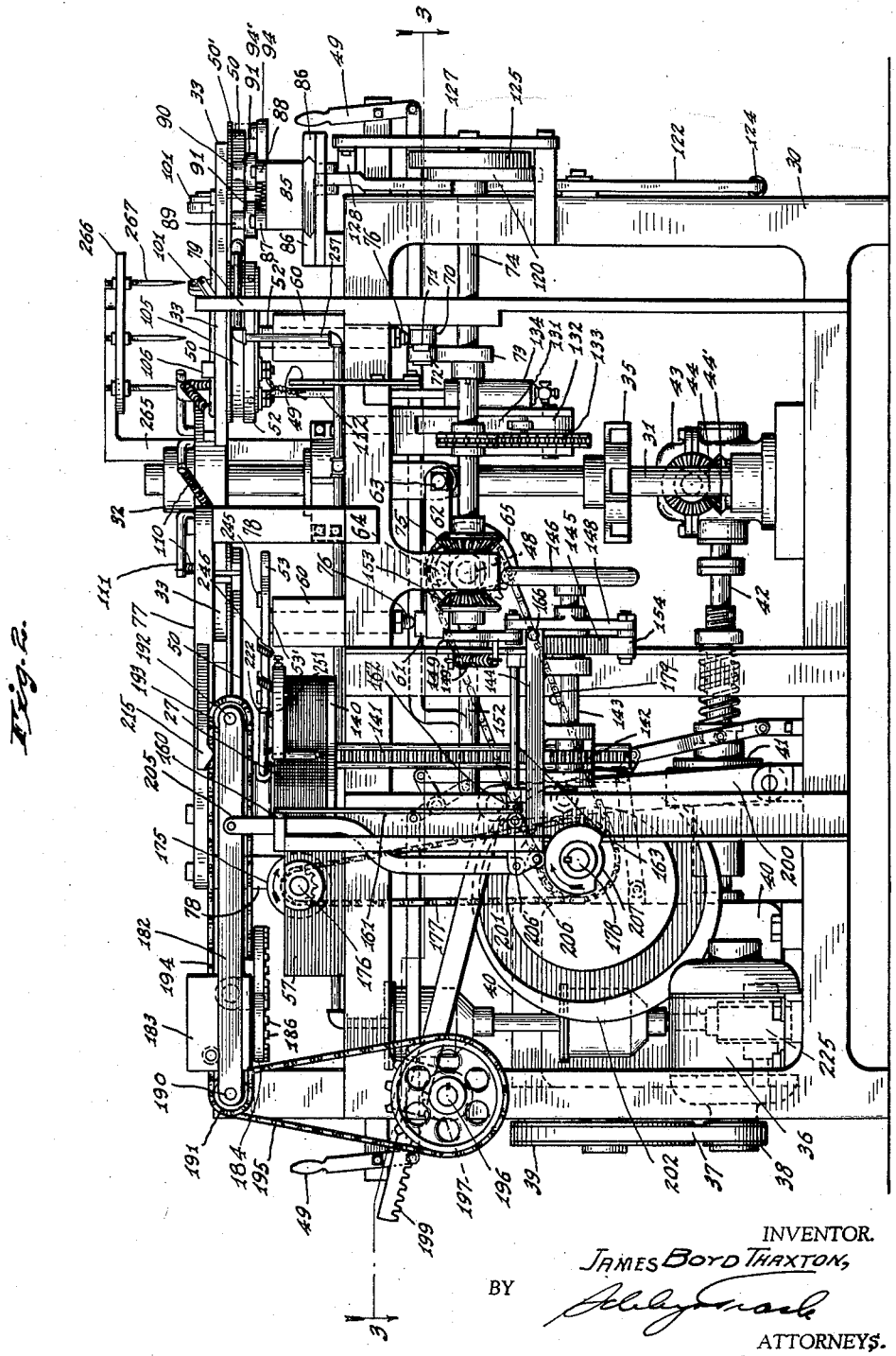
INVENTOR.
JAMES BOYD THAXTON,
BY
ATTORNEYS.

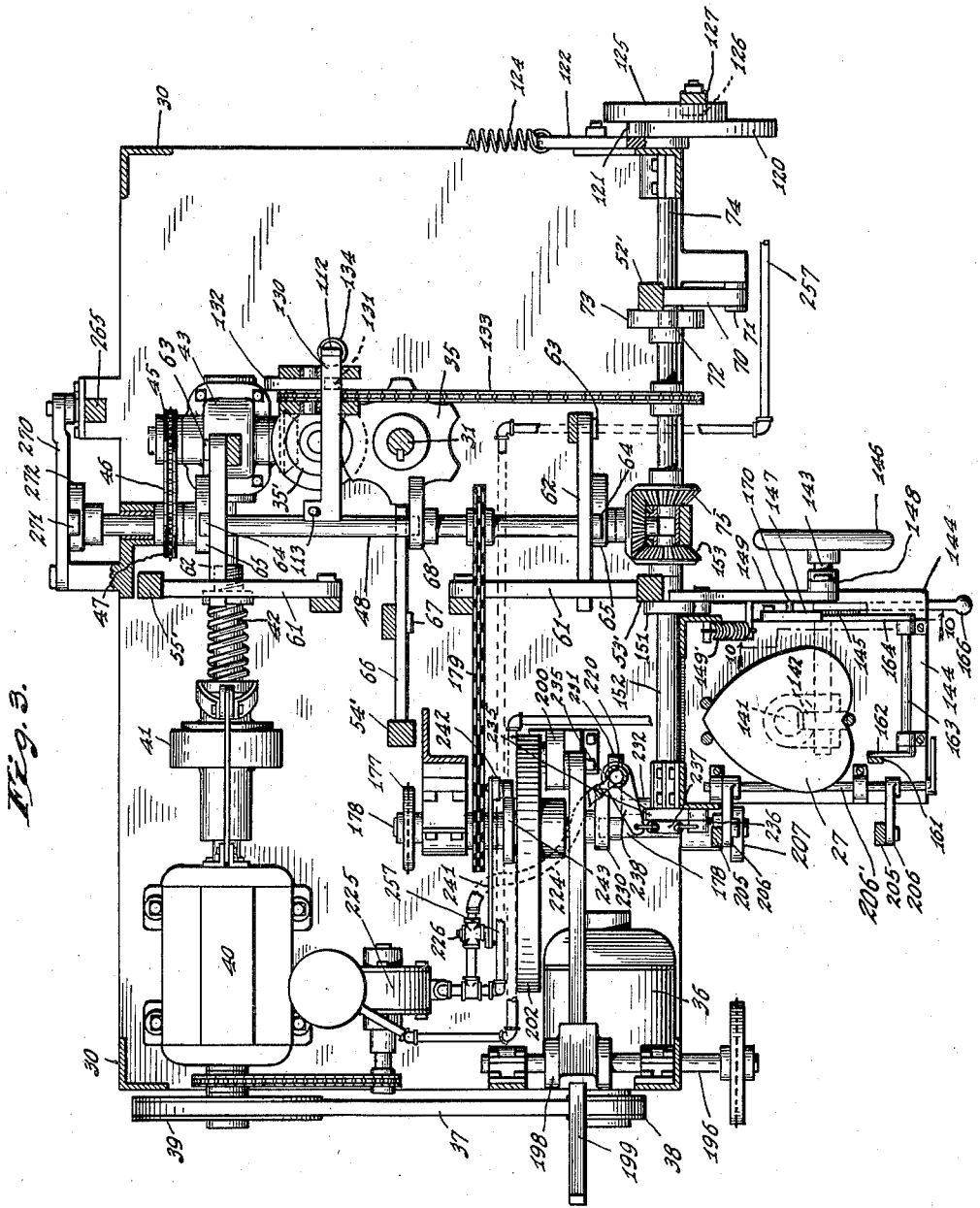

April 29, 1941.   J. B. THAXTON   2,240,445
BOX FORMING MACHINE
Filed April 10, 1939   6 Sheets-Sheet 4
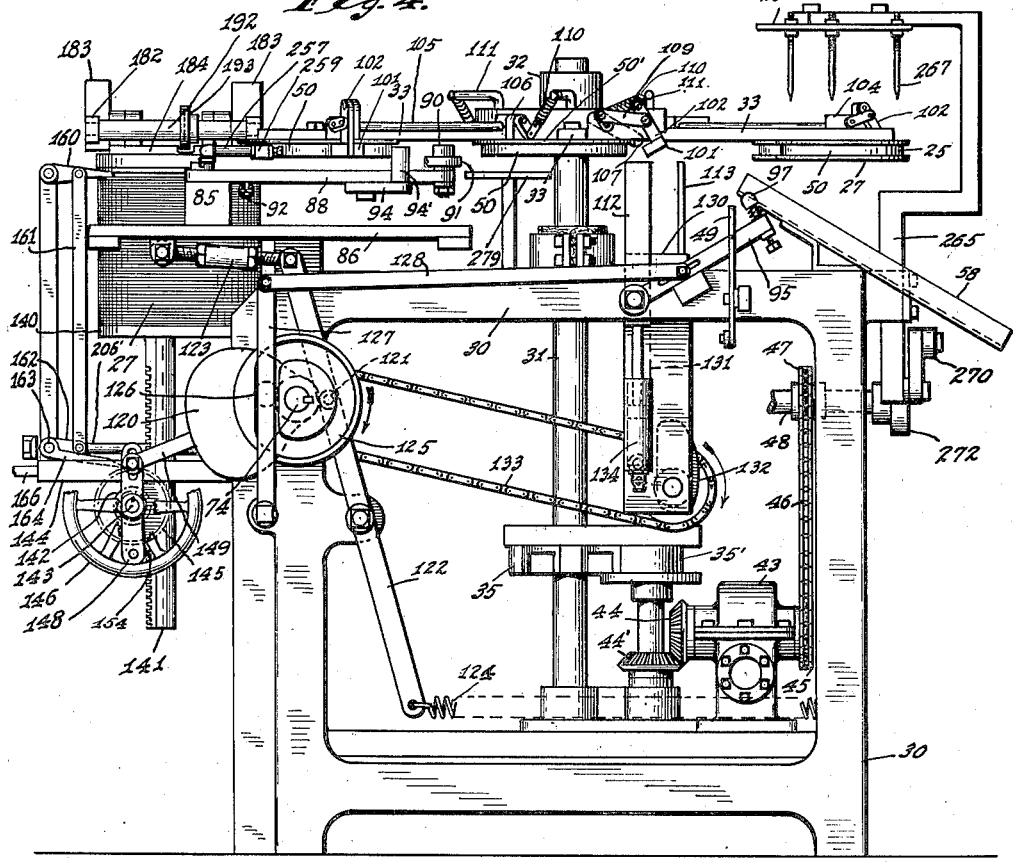
INVENTOR.
JAMES BOYD THAXTON,
BY
ATTORNEYS.

April 29, 1941.  J. B. THAXTON  2,240,445
BOX FORMING MACHINE
Filed April 10, 1939  6 Sheets-Sheet 5
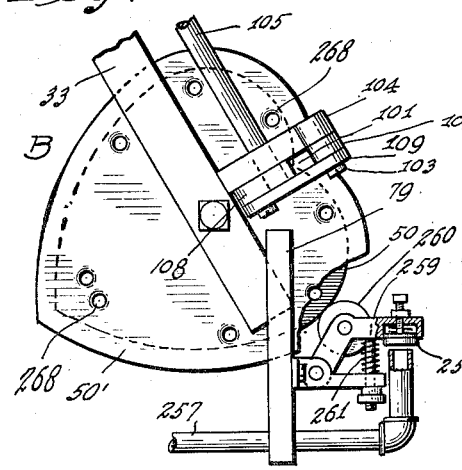
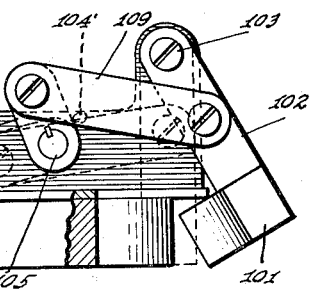
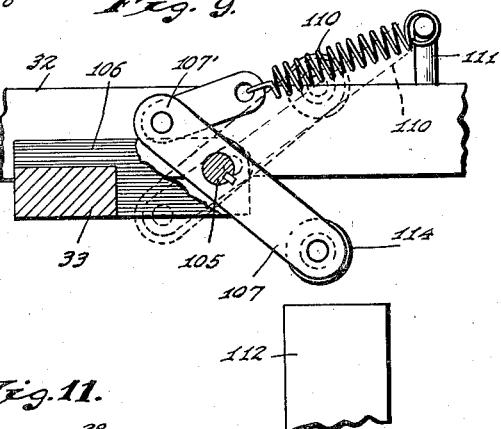
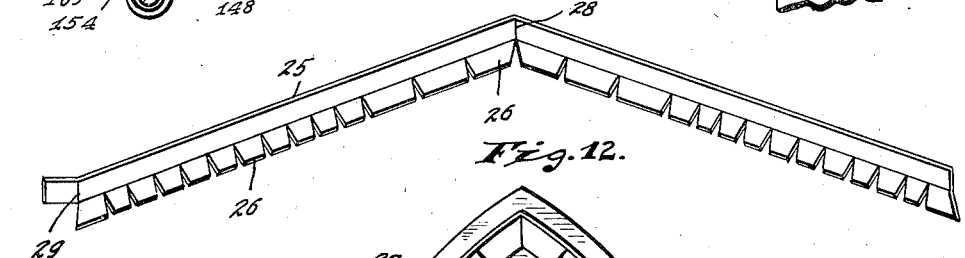
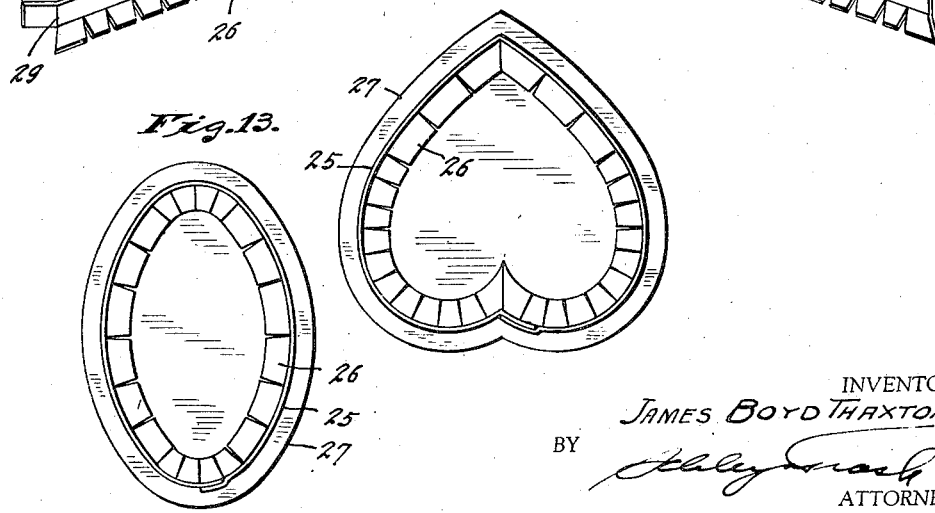
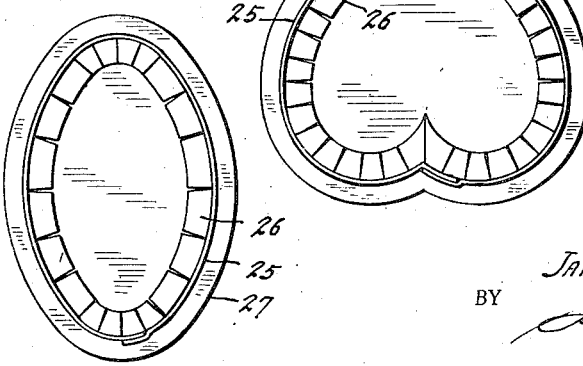
INVENTOR.
JAMES BOYD THAXTON,
BY
ATTORNEYS.

April 29, 1941. J. B. THAXTON 2,240,445
BOX FORMING MACHINE
Filed April 10, 1939 6 Sheets-Sheet 6
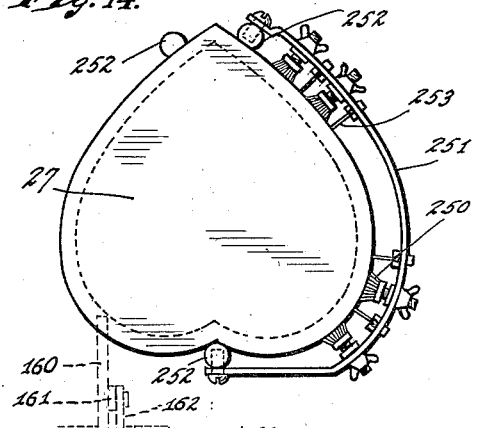
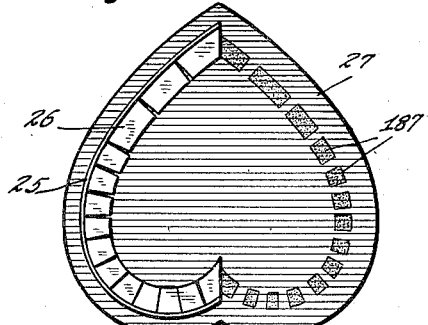
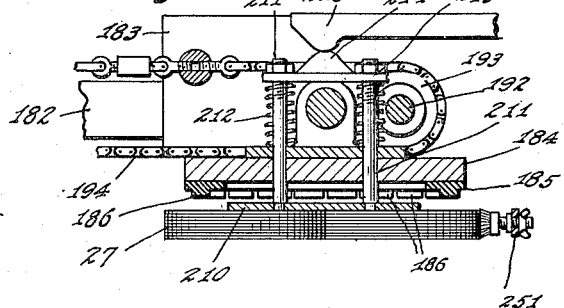
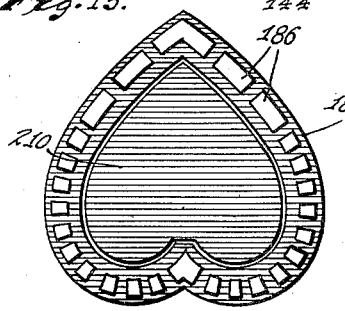
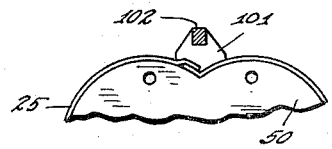
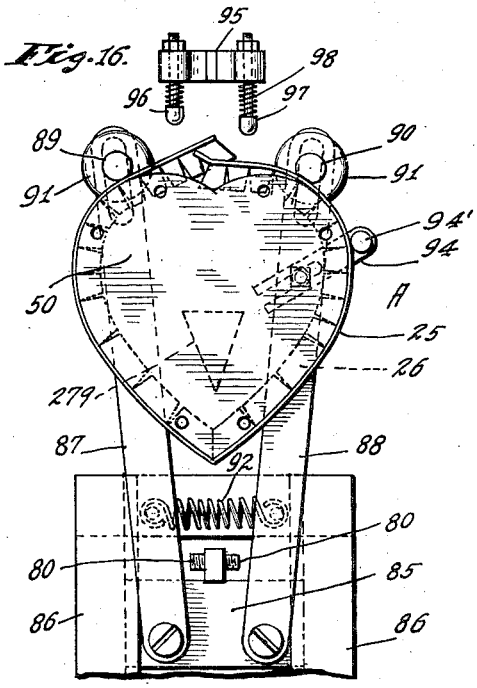
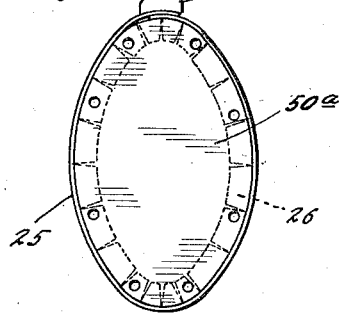
INVENTOR.
JAMES BOYD THAXTON,
BY
ATTORNEYS.

Patented Apr. 29, 1941

2,240,445

UNITED STATES PATENT OFFICE 2,240,445

BOX FORMING MACHINE

James Boyd Thaxton, Indianapolis, Ind., assignor to Paper Package Company, Indianapolis, Ind., a corporation of Indiana Application April 10, 1939, Serial No. 266,947

13 Claims. (Cl. 93—39)

My invention relates to machines for forming paper boxes, and especially to machines for forming boxes other than of the customary rectangular shape.

Among the objects of my invention are to construct a machine especially adapted for making boxes all the side walls of which are formed from a continuous strip bent to the desired configuration and provided with laterally extending tabs glued to the bottom or top of the box; to construct a machine which can be adapted to the formation of boxes of different shape by altering only a few parts of the machine; to construct a machine in which the side-wall tabs will be firmly and positively glued to the top or bottom of the box; to construct a machine in which the box will be formed by a continuous series of operations performed respectively at various stations in the travel of an endless conveyor, whereby to secure high-speed production; to avoid the feeding to the assembly station of less than all the parts required for a complete box; and generally to improve and simplify the construction of box-making machines.

In carrying out my objects, I construct the machine with an endless conveyor, desirably an intermittently rotating spider the arms of which carry form-plates corresponding to the internal shape and dimensions of the box to be formed. At one station in the rotation of the spider, the strip forming the side walls of the box is applied to the form plate and held in association therewith by means which travels with the form plate in movement of the conveyor. At the next station, the tabs on the wall-forming strip are bent against the bottom of the form plate and desirably heated. At the third station, the wall-forming strip is brought into association and glued to a box-bottom or box-top. At the second station, I arrange a sensing means which controls the feed of box-bottoms (or box-tops) to the assembly station. At a subsequent station, the assembled box is stripped from the form plate; and at stations intermediate the assembly station and the stripping station, arrangements may be provided to apply pressure to the glued joints between the tabs on the side wall and the box-bottom (or box-top).

The accompanying drawings illustrate my invention: Fig. 1 is a top plan view of a complete machine; Fig. 2 is a front elevation of the machine shown in Fig. 1; Fig. 3 is a horizontal section approximately on the line 3—3 of Fig. 2; Fig. 4 is an end elevation of the machine; Figs. 5 and 6 illustrate details of the mechanism for feeding box-bottoms or box-tops to the assembly station; Fig. 7 is a plan view illustrating a means which may be employed to control the feeding of box-bottoms or box-tops; Figs. 8 and 9 illustrate details of the clamping means employed to hold the side wall of the box in association with each form plate during application of the box-bottom or box-top; Fig. 10 is a section on the line 10—10 of Fig. 3 illustrating certain details of construction; Fig. 11 is a perspective view of a strip used to form the side wall of a box; Fig. 12 is a plan view of a completed box or box-cover of heart shape; Fig. 13 is a similar view of a box or box-cover of oval shape; Fig. 14 is a plan view of a stack of box-bottoms or box-tops showing the means employed for preventing feeding of more than one box-bottom or box-top at a time; Fig. 15 is a bottom plan view of the glue-applicating member; Fig. 16 is a fragmental plan view showing details of the wall-forming mechanism; Fig. 17 is a plan view of a box-bottom or box-top showing the pattern in which the glue is applied thereto; Fig. 18 is a vertical section illustrating details of the glue-applying mechanism; Fig. 19 is a fragmental plan view showing a form of clamping member suitable for use in the formation of a heart-shaped box; and Fig. 20 is a plan view illustrating a form-plate and clamping member suitable for use in the manufacture of oval boxes.

The box made by a machine embodying my invention may take a wide variety of forms, two of which are illustrated in Figs. 12 and 13. In general, such a box comprises a side wall 25 of desired configuration having along its lower edge a series of tabs 26 which are bent inwardly of the box and glued to the upper surface of the box-bottom 27. The latter desirably extends outwardly beyond the side wall to form a flange. Covers for the boxes may be formed on the machine and may be in general of the same construction, the only difference between a box and its cover lying in the fact that the side wall of the cover will have somewhat larger dimensions to permit it to telescope over the side wall of the box proper.

For purposes of illustration, I have shown and shall describe my invention as embodied in a machine adapted to form boxes of heart-shape. It will be understood, however, that my invention is not limited to the formation of boxes of this particular shape nor to the formation of boxes as distinguished from covers.

If the side wall of the box has any sharp bends, it is desirable to preform the wall-forming strip to the extent of creasing it or scoring it at the points where such bends will be located in the finished box. In the case of a heart-shaped box the strip 25 may be creased, as indicated at 28 and 29 in Fig. 12, for the bends located respectively at the point of the box and at the re-entrant angle. In addition, score-lines or creases may be provided where the tabs 26 join the body of the strip and the tabs bent toward the positions they will occupy in the finished box.

*General construction of mach'ne (Figs. 1 to 4 inclusive)*

The machine shown in the drawings embodies a frame 30 provided with suitable bearings for the support of a vertical shaft 31. The shaft 31 extends above the frame 30 where there is secured to it a spider consisting of a hub 32 and a series of equally spaced, radiating arms 33, here shown as six in number. Mounted on the frame is a means for rotating the shaft 31 intermittently. In the drawings, such means is shown as taking the form of the conventional Geneva movement including a driven star-wheel 35 mounted on the shaft 31 and a rotatable driving element 35' cooperating therewith.

Means are provided for driving the machine, such means conveniently taking the form of an electric motor 36 operatively connected, as through a belt 37 and pulleys 38 and 39, to the driving element of a variable-speed transmission 40. The driven element of the variable-speed transmission 40 is connected through a clutch 41 with a shaft 42 which is in turn connected to a speed-reduction unit 43. The various moving parts of the machine are driven from the speed-reduction unit 43 by suitable power-transmitting connections. Thus, the speed-reduction unit 43 may include two driven elements, one of which is in the form of a mitre gear 44 which co-operates with another mitre gear 44' to drive the Geneva movement 35—35' and the other of which is in the form of a sprocket 45 which, through a chain 46 and second sprocket 47, drives a shaft 48 extending from front to rear of the machine beneath the top of the frame 30.

Desirably, the means employed for controlling the clutch 41 and, through it, the operation of the entire machine includes a plurality of manually operated clutch-control members located at different points about the machine. In the drawings (Figs. 1 and 2), I have shown three of such clutch-control members in the form of levers 49, two mounted at opposite ends of the machine and a third on the front side of the machine.

When the shaft 31 is stationary, the six arms 33 mounted upon it extend respectively to six stations, indicated in Fig. 1 as A to F inclusive. At its outer end, each of the arms 33 has secured to it a form-plate 50 corresponding to the shape and internal dimensions of the box which the machine is to produce. At station A, the strip forming the side walls of the box is wrapped around the form plate 50 and is then secured thereto by means which travels with the form plate and which will be hereinafter described in detail. At stations B, C, D, and E respectively, there are mounted for vertical reciprocation beneath the form plates at such stations tables 52, 53, 54, and 55. The table 52 at station B is desirably heated, as by the use of an electric resistance heating element (not shown), to warm the tabs 26 as they are held against the bottom of the form plate 50 by the table. Associated with the plate 53 at station C is means, including a glue tank 57, for applying glue in predetermined pattern to the upper surface of the box-bottom 27 and for transferring such box-bottom to the table 53, which is then raised to force the box-bottom 27 against the tabs 26. At stations D and E, the tables 54 and 55 are elevated and forced against the box-bottom 27 further to secure the glued joint between it and the tabs 26. At station F, the finished box is stripped from the form plate 50 and delivered from the machine, as through the medium of a discharge chute 58.

The tables 52, 53, 54, and 55 at stations B, C, D, and E desirably reciprocate vertically in unison into and out of association with the form plates 50 respectively disposed at those stations. The tables are mounted respectively on the upper ends of shanks 52', 53', 54', and 55' which are supported for vertical sliding movement in guides 60 on the frame of the machine. The means for reciprocating each of the two tables 53 and 55 is shown as taking the form of a rocker arm 61 one end of which is pivoted to the frame 30 and the other end of which is disposed beneath the associated table-shank. Engaging beneath each of the arms 61 at an intermediate point thereof is the free end of a lever 62 the opposite end of which is pivoted to the frame of the machine as indicated at 63. Each of the arms 62 carries a cam roller 64 co-operating with a cam 65 on the shaft 48. The table 54 is raised through the medium of a rocker arm 66 which is pivoted at an intermediate point to the frame of the machine as indicated at 67. One end of the arm 66 is disposed beneath the shank 54', while the other end carries a cam-following roller co-operating with a cam 68 on the shaft 48. The shank 52' of the table 52 is raised through the medium of a rocker arm 70 pivoted to the frame of the machine as indicated at 71 and having its free end disposed beneath the lower end of the shank 52'. The arm 70 carries a cam-following roller 72 co-operating with a cam 73 mounted on a shaft 74 which extends horizontally along the front of the frame and is connected by mitre gearing 75 to the shaft 48 to rotate at the same speed. To regulate the height to which each of the tables 52, 53, 54, and 55 is elevated its shank may be provided with an adjustable thrust screw 76 which bears on the associated rocker arm.

At the stations C, D, and E, the outer ends of the arms 33 are supported against upward movement in order to prevent their deflection as a result of the upward pressure applied to the plates 50 at such stations by the tables 53, 54, and 55. For this purpose, I have shown the machine as provided with a bar 77 which extends across the machine and which is shaped to engage the upper surfaces of the arms 33 at the outer ends thereof. The bar 77 is supported from the frame 30 by being secured to the upper ends of pillars 78 which extend upwardly from the frame of the machine, as is clear from Fig. 2. For a similar purpose, a bar 79 may be provided at station B, such bar being secured to the frame 30, extending upwardly therefrom, and having its upper end disposed over the end of the arm 33 at station B to prevent excessive deflection of such arm when the table 52 is elevated.

*Wall-forming and retaining mechanism (Figs. 1, 2, 4, and 16)*

The mechanism illustrated in the drawings for applying the wall-forming strip 25 of the box to the form plate 50 at station A comprises a carriage 85 supported in guides 86 for horizontal reciprocation toward and away from the form plate. Pivotally attached to the carriage 85 are two arms 87 and 88 which extend horizontally from the carriage toward the form plate. At their outer ends, the arms 87 and 88 respectively carry vertically extending pins 89 and 90 each of which has associated with it a flange 91. The pins 89 and 90 are located in the same horizontal plane as is the form plate 50, and the flanges 91 are disposed near the bottoms of such pins to extend inwardly beneath the form plate 50. A spring 92, or other suitable means, acts between the arms 87 and 88 and biases them for movement toward each other.

Each form plate 50 is disposed on its associated arm 33 so that, when at station A, the point where the ends of the wall-forming strip 25 overlap is at the opposite side of the form plate from the carriage 85. In the case of a heart-shaped box, I deem it desirable to overlap the ends of the strip 25 within the re-entrant angle of the form, and each form plate 50 is therefore so disposed on the arm 33 that the point thereof, when the form plate is in station A, is directed toward the carriage 85. Various forms may require various dispositions on the arms 33; but in general it may be said that it is desirable to place the greatest dimension of each form plate at right angles to the associated arm 33.

With the arms 87 and 88 in their retracted position (the dotted-line position shown in Fig. 1) a strip 25 is brought into association with the form plate 50 at station A with the crease 28 at the point of the form plate. Before the strip is thus positioned, glue is applied to one end of the strip where it will overlap the other end in the finished box. As the carriage 85 advances from its retracted position, the pins 89 and 90 engage the strip 25 and force it into contact with the form plate 50, the pins being yieldingly forced toward the form plate by the action of the spring 92 so that as forward movement of the carriage 85 continues, the strip 25 is bent around the form plate and its ends brought into overlapping relation in rear thereof, as illustrated in Fig. 16. During this wrapping operation, the flanges 91 support the strip and force the tabs 26 into contact with the bottom of the form plate 50. To prevent the strip from climbing as it is wrapped, each form plate may be provided at its top with an outwardly projecting peripheral flange 50'.

Desirably, I provide on the carriage 85 some means for locating the arms 87 and 88 in order that the pins 89 and 90 will engage the strip 25 at the proper points when the wrapping operation starts. As is clear from Fig. 16, this means may comprise a pair of stop-screws 80 adjustably mounted in the carriage 85 and disposed to engage the arms 87 and 88 respectively and limit their movement toward each other when the carriage is retracted.

To avoid interference between the two ends of the strip 25 as they are brought into overlapping relation, the pins 89 and 90 are so arranged that one, here shown as the pin 90, will move inwardly across the rear face of the form plate in advance of the other so as to deposit the strip-end with which it is associated across the rear face of the form plate before the opposite end of the strip is moved inwardly far enough to interfere. This result may be accomplished by relieving one of the pins (shown in Fig. 16 as the pin 90) on that face which is adjacent the form plate 50 as the pins near the end of their wall-forming movement. Because of this relief, the pin 90, as the carriage 85 approaches the limit of its forward movement, will move inwardly across the rear face of the form plate more rapidly than will the other pin 89; and the strip-end acted upon by the pin 90 will therefore be disposed between the form plate 50 and the other strip-end, as is clear from Fig. 16.

In order to prevent the arms 87 and 88 from coming so close together that the pins 89 and 90 will interfere with the means for clamping the ends of the strip 25 in overlapping relation, forward movement of the carriage 85 is terminated before the pin 89 has reached the rearmost point of the form plate. Because of its relief the pin 90, as evident from Fig. 16, will be carried out of co-operation with the rear face of the form plate 50 before the pin 89 has reached the limit of its inward and rearward movement in the formation of the side wall of the box. This movement of the pin 90 away from the rear face of the form plate releases the adjacent end of the wall-forming strip 25. To prevent the strip 25 from unwrapping when its end is thus released, and also to prevent the arm 88 from swinging too far inwardly, I mount on the arm 88 a lateral extension 94 which carries a pin 94' positioned to engage the strip 25 as the carriage 85 approaches its limit of inward movement and to hold the strip against the side of the form plate 50.

To force the ends of the strip 25 into the re-entrant portion of the form plate 50, I mount on the end of the frame 30 a swinging arm 95 (Figs. 4 and 16) which carries at its free end a pair of horizontally spaced pins 96 and 97 positioned to engage the respective ends of the strip 25 as the arm 95 is advanced into association with the form plate 50 at station A. As indicated in the drawings, the pin 96, which engages that end of the strip 25 wrapped around the form plate by the pin 89, is shorter than the pin 97 to provide clearance for the adjacent end of the strip 25 as it is moved across the re-entrant portion of the form plate. The pin 97 is slidably mounted in the arm 95 and biased toward advanced position as by a compression spring 98 so that after the pin 97 forces the associated end of the strip 25 into contact with the form plate movement of the arm 95 can continue to permit the shorter pin 96 to perform the same operation on the other end of the strip 25. If desired, the pin 96 may also be slidably mounted in the arm 95 and biased toward advanced position to accommodate over-travel of the arm 95.

I find it advantageous to mount the pins 89 and 90 on the respective arms 87 and 88 so that the positions of the pins longitudinally of the arms may be varied to accommodate for different weights and qualities of board and for differences in forming qualities occasioned thereby. Such an adjustment of the pins 89 and 90 may be arranged for by providing the arms 87 and 88, near their free ends, with slots in which the pins are mounted.

As previously indicated, there is associated with each of the form plates 50 a clamp which presses the overlapping ends of the strip 25 together to provide a firm joint between them. This clamp includes a clamping member 101 shaped to clamp the overlapping ends of the strip 25 tightly against the re-entrant walls of the form plate 50, Each of the clamping members 101 is provided with an upwardly extending stem 102 pivotally mounted, as by a screw 103, upon a bracket 104 attached to the upper surface of the associated form plate 50, the mounting being such that the clamping member 101 can swing from the retracted position shown in Fig. 8 to the clamping position illustrated in Fig. 19.

For the purpose of operating each of the clamping members 101, there is associated with each of the arms 33 a rock shaft 105 which extends generally parallel to the associated arm 33. As shown in Fig. 9, the inner end of each of the shafts 105 is supported in a suitable bearing 106 and carries an operating member keyed to the shaft for rotation therewith and having two arms 107 and 107' extending transversely in opposite directions from the shaft. The outer end of the shaft 105 is mounted in the bracket 104 and carries a crank-arm 108 connected by a link 109 to the stem 102 of the clamping member 101, as is clear from Fig. 8.

The clamping member 101 is yieldingly held in retracted position (the full-line position in Fig. 8) by a spring 110 which acts between the arm 107' and a rod 111 projecting outwardly from the spider-hub 32. Movement of the clamp-parts under the influence of the spring 110 is limited, as by means of a pin 104' mounted in the bearing block 104 in position to engage the crank-arm 108 and limit its clockwise rotation. Retention of the clamp-member 102 in clamped position is secured by arranging the parts so that the centerline of the spring 110 crosses the axis of the shaft 105 as the clamp-member approaches its operative position (the dotted-line position in Fig. 8). When this occurs, the effect of the spring 110 upon rotation of the shaft 105 is reversed and the spring thereafter tends to rock the shaft in a counterclockwise direction to hold the clamping member 101 firmly in engagement with the end of the strip 25 on the form plate 50.

For the purpose of operating the clamping mechanism, I mount for vertical reciprocation relative to the frame 30 two push-rods 112 and 113, the former being disposed beneath the outer end of the arm 107 at station A and the latter beneath the outer end of the arm 107' at station E. As the push-rod 112 rises, it engages a roller 114 on the arm 107 and rocks the shaft 105 to bring the clamp-member 101 into operative position, where it is held by the spring 110. As the push-rod 113 rises, it engages the arm 107 at station E and rocks the shaft 105 to release the clamp.

The various moving parts of the wall-forming mechanism above described may all be operated by means driven from the shaft 74. As will be clear from Fig. 4, the shaft 74 carries a cam 120 which engages a cam-following roller 121 on a pivoted lever 122. The upper end of such lever is connected through a link 123 to the reciprocating carriage 85. A spring 124, operating between the lever 122 and a stationary point, serves to hold the cam-follower 121 in engagement with the cam 120. Desirably, the link 123 is made adjustable in length in order to regulate properly the advanced position of the arms 87 and 88.

The shaft 74 is also shown in Fig. 4 as carrying a box cam 125 the cam groove of which receives a roller 126 on a lever 127. The upper end of the lever 127 is connected by means of a link 128 to the swinging arm 95, the connection between the link 128 and arm 95 desirably being adjustable to vary the advanced position of the pins 96 and 97 which that arms bears.

The clamp-operating members 112 and 113 are desirably reciprocated in unison and, to this end, they both may be supported from a horizontally extending bar 130 (Fig. 3) having a shank 131 extending downwardly and supported for vertical reciprocation from the frame 30. The lower end of the shank 131 is associated with a cam 132 rotatably supported from the frame 30 and driven, as by a chain drive 133, from the shaft 74. The cam 132 serves merely to raise the shank 131 and the parts which it bears, such parts being restored to normal position by their own weight. To avoid too rapid descent of such parts, dash-pot mechanism 134 may be provided.

*Box-bottom magazine (Figs. 1, 2, 3, and 10)*

Adjacent station C, there is provided a vertically movable platform 140 for the support of a stack of the box-bottoms 27. Vertical movement of the platform 140 is effected by a rack 141 which extends downwardly from the platform into association with a pinion 142 on a shaft 143. The shaft 143 is rotatably supported in a sub-frame 144 on the main frame 30, and has rotatable with it a ratchet-wheel 145 and a hand-wheel 146. A pawl 147 mounted on the sub-frame 144 co-operates with the ratchet wheel 145 and acts, when engaged, to prevent retrograde rotation of the shaft 143 and descent of the platform 140 under the influence of its weight.

For the purpose of elevating the platform 140 as the box-bottoms 27 thereon are successively used, I mount on the shaft 143 an oscillating arm 148 connected to the end of a link 149 the other end of which bears a cam-follower 150 cooperating with a cam 151 on a shaft 152 and held in engagement with such cam as by means of a spring 149' acting on the link 149. The shaft 152 may be driven through gearing 153 from the shaft 48. A pawl 154 on the arm 148 is held in association with the ratchet wheel 145 by a spring 155. It will be apparent from the above description that as the shaft 152 rotates in the operation of the machine the arm 148 will oscillate and the ratchet mechanism 145—154 will rotate the pinion 142 intermittently to cause a correspondingly intermittent raising of the platform 140.

Desirably, some means is provided for regulating the operation of the mechanism which moves the platform 140 upwardly in order to maintain the top of the stack of box-bottoms 27 at a substantially constant level. The means illustrated in the drawings for accomplishing this purpose takes the form of a finger 160 pivotally supported from the sub-frame 144 and having its free end disposed to rest upon the uppermost box-bottom of the stack on the platform 140. The finger 160 is connected by a link 161 and an arm 162 to a rock-shaft 163 on the sub-frame 144. Rigid with the rock-shaft 163 I provide a pawl-lifter 164 which extends inwardly of the sub-frame 144 and has its free end disposed beneath the retaining pawl 147.

As the upper end of the stack of box-bottoms 27 on the platform 140 reaches the desired position, the uppermost box-bottom engages the finger 160 and lifts it, thus raising the free end of the pawl-lifter 164 to move the pawl 147 to inoperative position out of engagement with the ratchet wheel 145. Thereafter, the shaft 143 will oscillate with the arm 148, being moved in a forward direction by the pawl 154 and in a reverse direction by the weight of the platform 140 and its contents. As a result, upward feeding of the platform 140 is interrupted and is not resumed until, by removal of box-bottoms from the top of the stack, the finger 160 drops to an extent sufficient to permit re-engagement of the pawl 147 with the ratchet wheel 145.

To permit free manual movement of the platform 140 there is mounted in the sub-frame 144 a horizontally slidable member 166 which has at its inner end a pair of fingers 167 and 168 provided with inclined end surfaces positioned to engage pins 169 and 170 respectively on the pawls 154 and 147 and to move such pawls out of engagement with the ratchet wheel 145. The member 166 may be held normally in inoperative position by a retracting spring 171. By moving the member 166 inwardly against the force exerted upon it by the spring 171, the pawls 147 and 154 are disengaged from the ratchet wheel 145 so that the shaft 143 can be rotated freely in either direction by the hand wheel 146.

*Glue-applying mechanism (Figs. 1, 2, 15, 17, and 18)*

The glue-applying mechanism applies glue to the upper surface of the box-bottom at the top of the stack on the platform 140, and desirably applies such glue in a predetermined pattern corresponding to the disposition of the tabs 26 on the strip 25 which forms the side walls of the box.

Mounted for rotation above the glue-tank 57 is a transfer roll 175 disposed so that its top is slightly higher than the top of the stack of box-bottoms 27 on the platform 140 and so that its bottom dips into the supply of glue in the tank 57. This transfer roll is positively driven, desirably by being mounted upon a shaft 176 which is connected through a chain-and-sprocket drive 177 to a countershaft 178 in turn driven through a chain-drive 179 from the shaft 48.

A sub-frame 182 is pivotally supported at one end from the frame 30 and extends generally horizontally above the glue-transfer roll 175, its free end being disposed above the stack of box-bottoms 27 on the platform 140. A carriage 183 is slidably mounted in the sub-frame 182 and has pivotally suspended from it a carrier 184 for a glue-applicator 185. The glue applicator 185 corresponds generally in shape to the box being made upon the machine and is provided on its lower surface with a series of downwardly extending lugs 186 arranged in a pattern corresponding to that of the tabs 26 on the wall-forming strip 25. In the operation of the glue-applying mechanism the applicator 185 is moved over the roll 175 with the lugs 186 in contact with the roll, is brought to rest above the stack of box-bottoms 27, lowered into contact with the uppermost of such box-bottoms to apply thereto the glue on the lower surfaces of the lugs 186, and then returned. As is clear from the right-hand half of Fig. 17, this glue is applied in the form of a series of spots 187 corresponding to the disposition of the tabs 26.

Movement of the applicator 185 in the sub-frame 182 may be secured in various ways. I prefer, however, to mount the sub-frame 182 co-axially with a shaft 190 carrying a sprocket 191. In the free end of the sub-frame 182 there is rotatably supported a shaft 192 which carries a sprocket 193. A chain 194 runs over the sprockets 191 and 193 and has its free ends secured to the carriage 183, as indicated in Figs. 1 and 18. With this arrangement, rotation of the shaft 190 in one direction will move the carriage 183 from the position shown in Fig. 1 across the top of the roller 175 into a position above the platform 140, and reverse rotation of the shaft will restore the applicator to its original position.

To rotate the shaft 190 in the manner indicated, it is connected by a chain 195 to a counter-shaft 196 rotatably supported in the frame 30. The shaft 196 carries a pinion 197 and a guide 198 (Fig. 3) for a reciprocable rack 199 meshing with the pinion 197. The rack 199 extends inwardly of the frame 30 and is pivotally connected at its inner end to the upper end of a swinging arm 200. The arm 200 is pivoted at its lower end to the frame 30 and, at an intermediate point, is provided with a cam-roller received in a groove 201 in the face of a cam 202 rotatable with the shaft 178. As the shaft 178 rotates, the arm 200 is oscillated to cause reciprocation of the rack 199. This causes the shaft 196 to rotate alternately in opposite directions, rotation of the same character being imparted to the shaft 190 through the chain drive 195. The speed-ratio of the chain drive 195, the size of the pinion 197, and the shape of the cam-groove 201 are all selected with due regard to each other to produce the desired movement of the sliding carriage 183.

Vertical movement of the free end of the sub-frame 182 is controlled by means of links 205 which extend downwardly from an intermediate point on the sub-frame 182 and have their lower ends connected to arms 206 which are rigid with a rock-shaft 206' on the sub-frame 144 and one of which is provided with a cam-follower cooperating with a cam 207 on the shaft 178. Normally, the cam 207 holds the sub-frame 182 in such position that the lugs 186 on the applicator 185 will engage the upper surface of the glue-transfer roll 175 as the applicator moves thereover; but as the carriage 183 comes to rest at the inner limit of its movement the cam 207 lowers the free end of the sub-frame 182 and permits the applicator to drop upon the uppermost box-bottom 27 in the stack of box-bottoms on the platform 140 to apply to such box-bottoms the glue with which the lower surfaces of the lugs 186 were coated. With the carriage 183 still at rest, the cam 207 now raises the free end of the frame 182; and, with the sub-frame so raised, the carriage is returned to its normal position by operation of the cam 202.

For the purpose of preventing a box-bottom from adhering to the applicator 185, the stripping mechanism illustrated in Fig. 18 may be employed. This mechanism comprises a stripper-plate 210 attached to the lower ends of pins 211 which are arranged for vertical movement in the applicator-carrier 184. Springs 212 acting against a yoke 213 which extend between the upper ends of the pins 211 normally serve to hold the stripper plate 210 against the under surface of the applicator mounting 184. The yoke 213, however, carries an upwardly projecting boss 214 having an inclined surface cooperating with an abutment 215 supported from the frame 30 in position to engage the boss 214 and depress the yoke 213 when the carriage 183 reaches the inner limit of its movement in the sub-frame 182. As a result of depression of the yoke 213, the stripper plate 210 is forced into engagement with the uppermost box-bottom 27 so as to prevent such box-bottom from raising with the applicator 185 when the latter is lifted after application of the glue.

Box-bottom transfer mechanism (Figs. 1, 2, 3, 5, 6, 7, and 14)

After the glue has been applied to the uppermost box-bottom 27 and after the carriage 183 has been retracted from above the stack of the box-bottoms, the uppermost box-bottom is transferred to the table 53 at station C.

The transfer mechanism comprises a shaft 220 mounted for vertical movement and for oscillation about its own axis in the frame 30 and provided with an axial passage 220'. At its upper end, the shaft 220 carries a transversely projecting arm 222 upon which are mounted one or more suction-cups 223 positioned to engage the uppermost box-bottom of the stack on the platform 140. The interiors of the cups 223 communicate with a longitudinal passage 222' in the arm 222 which passage, in turn, communicates with the axially extending passage 220' in the shaft 220. This latter passage is connected, as through the medium of a flexible hose 224, with the inlet of an air compressor 225 driven in any suitable manner from the motor 26. The connection of the hose 224 to the air compressor includes a valve 226 by operation of which the passage 220' in the shaft 220 can either be connected to the inlet of the air compressor to exhaust air from the cups 223 or to atmosphere to relieve the suction within such cups.

Movement of the arm 222 and operation of the valve 226 are controlled from the shaft 178. This shaft has rotatable with it a cam 230 co-operating with a rocker arm 231 upon which the lower end of the shaft 220 rests. The rocker arm 231 is pivotally mounted at an intermediate point upon a pivot 232; and a spring 233, acting on the shaft 220, serves to force such shaft downwardly and to maintain the rocker arm 231 in association with the cam 230. Oscillation of the shaft 220 is secured by a cam 235 mounted for rotation upon the shaft 152 previously described. As will be clear from Fig. 6, the cam 235 oscillates a pivoted lever 236 the free end of which is connected through a link 237 with an arm 238 projecting laterally from the shaft 220. A spring 239 acts on the shaft 220 and tends to rotate it in a direction which will maintain the lever 236 in co-operation with the cam 235.

The valve 226 is controlled by a link 241 connected to a rocker arm 242 actuated by a cam 243 on the shaft 178.

In the operation of the box-bottom transfer mechanism, the arm 222 is swung to the position shown in dotted-lines in Fig. 5 and in full-lines in Fig. 1 after the glue-carriage 183 of the glue-applying mechanism has been withdrawn from above the stack of box-bottoms, and is then lowered until the suction-cups 223 engage the uppermost box-bottom in the stack. After this is done, the valve 226 is closed by the cam 243 to create sub-atmospheric pressure within the cups 223 so that the uppermost box-bottom 27 will be lifted when the shaft 220 is raised by the cam 230 and rocker-arm 231. These operations are performed while the carrier 32—33 is at rest. After the box-bottom has been thus raised, the carrier 32—33 is indexed and the cam 235 then rocks the shaft 220 to cause the arm 222 to move to the full-line position illustrated in Fig. 5 above the table 53 at station C. With the arm 222 in this position, the valve 226 is operated to vent the passages within the shaft 220 and arm 222, thus breaking the suction in the cups 223, and the box-bottom 27 drops upon the table 53. To locate the box-bottom upon the table, the latter may be provided with a series of locating-members 245. To prevent the leading edge of the box-bottom 27 from engaging the table 53 as it is moved thereover, the latter may carry one or more inclined guides 246 which extend outwardly and downwardly from it toward the stack of box-bottoms on the platform 140.

I find it desirable to associate with the stack of box-bottoms on the platform 140 means which will prevent more than one box-bottom from being elevated by the suction cups 223. One means which I have found suitable for this purpose takes the form of a plurality of relatively stiff brushes 250 which are mounted upon a support 251 in such a position that their bristles engage the edges of the box-bottoms 27 at and near the top of the stack. The support 251 is conveniently mounted upon stationary guide-rods 252 which are disposed about the periphery of the stack of box-bottoms on the platform 140 and which serve to guide those box-bottoms as they are moved vertically in the operation of the machine. The brushes 250 may be supplemented by rigid pins 253 which are also mounted on the support 251 and which extend inwardly therefrom into engagement with the edges of box-bottoms near the top of the stack. As a further means of preventing more than one box-bottom from being transferred to the table 53, I may dispose adjacent the top of the stack of box-bottoms 27 one or more air discharge nozzles 255 connected to receive air from the compressor 225. The blasts of air from these nozzles impinging on the edges of the box-bottoms from the nozzles 255 will tend to separate them so that only the top one will be lifted by the suction cups 223.

If desired, I may incorporate in the machine means for preventing the feeding of box-bottoms 27 to the table 53 when the form plate 50 at station C has no wall-forming strip 25 upon it. For this purpose, the inlet of the air compressor 225 has connected to it a pipe 257 which extends to station B and has its open end arranged in association with a valve member 258. The valve member 258 is yieldingly mounted in the outer end of an arm 259 which is pivotally supported and which carries a roller 260 disposed in the plane of the form plate 50 at station B. A spring 261 acts on the arm 259, forcing the roller 260 toward the form plate 50 and the valve member 258 away from the adjacent end of the pipe 257. The valve member 258 is so mounted that if the roller 260 engages the form plate 50 the end of the pipe 257 will be uncovered, whereas if the roller 260 engages a wall-forming strip 25 on the form plate 50 the valve member 258 will close the open end of the pipe 257. As a result, if no wall-forming strip 25 is present on the form plate 50 at station B, the inlet of the air compressor 225 will remain connected to atmosphere through the open end of the pipe 257, no suction will be applied to the cups 223 and no box-bottom will be raised to be fed to the table 53. If, on the other hand, there is a wall-forming strip on the form plate 50 at station B the end of the pipe 257 will be closed so that suction can be applied to the cups 223 and a box-bottom elevated and later fed to the table 53.

Stripper mechanism (Figs. 1, 2, 3, and 4)

At station F, there is mounted on the frame a vertically slidable rod 265 to the upper end of which I secure a plate 266 positioned above the form plate 50 at that station. Secured to the plate 266 are a plurality of downwardly extending pins 267 positioned respectively in alinement with holes 268 in the form plate 50. Normally, the plate 266 is disposed in the elevated position illustrated in Figs. 2 and 4, with the pins 267 well above the plane of the arms 33 so as not to interfere with movement thereof. When the carrier 32—33 comes to rest, however, the rod 265 is lowered and the pins 267 enter the holes 268 in the form plate 50, engage the box thereon, and force it from the form plate so that it will drop into the discharge chute 59. Desirably the pins 267, or at least some of them, are disposed to engage tabs 26 of the box so that the stripping action will not impose a strain upon the glued joints between such tabs and the box-bottom 27.

For the purpose of moving the stripper 265—266—267 vertically, its lower end may be operatively connected to the free end of a rocker arm 270 pivotally mounted upon the frame 30. At an intermediate point, the arm 270 carries a cam-follower 271 resting on the upper surface of a cam 272 rigid with the shaft 48. By its engagement with the follower 271, the cam 272 normally holds the stripper in elevated position but is so shaped that, with the carrier 32—33 at rest, the stripper may drop of its own weight to force the finished box from the form plate.

*Operation*

As will be clear from the above description, the carrier 32—33 is rotated intermittently by the Geneva movement 35—35' so that each of the arms 33 successively comes to rest at the various stations A to F inclusive. With the carrier at rest, a wall-forming strip 25 is applied to the form plate 50 at station A and wrapped around the form plate by operation of the pins 90 and 91 in forward movement of the carriage 85, its ends being brought into overlapping engagement and secured by the operation of the pins 96 and 97 and clamping member 101. The carriage 85 stays in its advanced position until the beginning of indexing movement of the carrier 32—33 and is retracted during such indexing movement to be in position to begin a new wall-forming operation as the next succeeding form plate 50 reaches station A. To prevent the arms 87 and 88 from swinging unrestrainedly inwardly as the form plate 50 is withdrawn from between the pins 89 and 94', I may mount on the frame 30 a member 279 which extends upwardly into the plane of the arms in a position to limit their inward swinging movement and prevent the pins 89 and 90, or their flanges 91, from striking the clamp member 101 or the arm 95.

At station B the table 52 is elevated after the carrier 32—33 has come to rest, such table engaging the tabs 26 on the wall-forming strip 25 and forcing them into contact with the lower surface of the form plate 50. While the table 52 remains in contact with the tabs, the latter are heated by the heating element embodied in the table 52.

While the carrier 32—33 is at rest, the arm 222 of the box-bottom transfer mechanism is elevated by the cam 236. Should there be no wall-forming strip 25 on the form plate 50 at station B the end of the suction pipe 257 will be open to atmosphere, no suction can exist in the suction cups 223, and no box-bottom 27 will be lifted from the stack when the arm 222 is raised. If, however, there is a wall-forming strip on the form plate at station B, the valve 258 will close the end of the suction pipe 257 so that sub-atmospheric pressure can exist within the suction cups 223, in which event a box-bottom 27 will be elevated by the cups in position to be swung over the table 53 at station C after the next indexing movement of the carrier 32—33.

Before that next indexing movement of the carrier begins the table 52, together with the tables 53, 54, and 55 is lowered. After the carrier-arm 33 moving from station C to station D has cleared the table 53, the arm 222 is swung to a position above that table by the action of the cam 235, the valve 226 is operated by the cam 243 to vent the suction cups 223, and the box-bottom 27 drops on to the table 53, being located in proper position thereon by the locating members 245. The arm 222 is then retracted to its position above the platform 140; and, after the carrier has come to rest in its new position, the table 53 is elevated to force the box-bottom 27 against the lower surfaces of the tabs 26 of the wall-forming strip 25 on the form plate 50.

After the tables 52, 53, 54, and 55 have again been lowered, the next indexing movement of the carrier 32—33 conveys the box to station D, and the following indexing movement conveys it to station E. At these stations, the respective tables 54 and 55 are elevated against the box-bottom 27 during the dwell of the carrier and exert pressure on the glued joint between the tabs 26 and the box-bottom. To prevent any box-bottom from falling during indexing movement of the carrier, supports 280 may extend from station C to station D and from station D to station E.

At station E the clamping member 101, which has been pressing the overlapped ends of the strips 25 together during movement of the box from station A to station E, is released by upward movement of the push-rod 113 above described, so that when the stripper 226—227 is lowered, after the box has reached station F, the box will be stripped from the form plate 50 and deposited in the discharge chute 58.

To make boxes of different shapes on a machine of the type described, it is only necessary to change a few of the parts which actually engage the side walls 25 and box-bottoms 27. Thus, for example, to make an oval box such as that shown in Fig. 13, each of the heart-shaped form plates 50 would be replaced by an oval form plate 50a, as indicated in Fig. 20, the glue-applicator 185 would be changed for one which applied the glue in proper pattern for the new box-shape, the stripper 226—227 would be appropriately altered, etc.

I claim as my invention:

1. In a box-forming machine, a rotatable carrier, an annular series of box-forms mounted on said carrier, means for rotating said carrier intermittently to bring said forms successively to each of a series of stations, mechanism at one of said stations for wrapping about the form thereat a flexible wall-forming strip having along its lower edge a series of tabs, a reciprocable table at the next station for forcing said tabs against the lower face of the form, heating means associated with said table for heating it, a second reciprocable table at a subsequent station, means for successively depositing box-bottoms on said second table, mechanism for applying an adhesive in predetermined pattern to each of said box-bottoms before it is deposited on said second table, a third reciprocable table at a subsequent station, stripping mechanism at a still subsequent station, and means for actuating said wall-forming mechanism and said glue applying mechanism and for reciprocating said tables and operating said carrier-moving means all in timed relationship.

2. In a box-forming machine, a rotatable carrier, an annular series of box-forms mounted on said carrier, means for rotating said carrier intermittently to bring said forms successively to each of a series of stations, mechanism at one of said stations for wrapping about the form thereat a flexible wall-forming strip having along its lower edge a series of tabs, a reciprocable table at the next station for forcing said tabs against the lower face of the form, a second reciprocable table at a subsequent station, means for successively depositing box-bottoms on said second table, mechanism for applying an adhesive in predetermined pattern to each of said box-bottoms before it is deposited on said second table, a third reciprocable table at a subsequent station, stripping mechanism at a still subsequent station, and means for actuating said wall-forming mechanism and said glue applying mechanism and for reciprocating said tables and operating said carrier-moving means all in timed relationship.

3. In a box-forming machine, a rotatable carrier, an annular series of box-forms mounted on said carrier, means for rotating said carrier intermittently to bring said forms successively to each of a series of stations, mechanism at one of said stations for wrapping about the form thereat a flexible wall-forming strip having along its lower edge a series of tabs, a reciprocable table at a subsequent station, means for successively depositing box-bottoms on said table, mechanism for applying an adhesive in predetermined pattern to each of said box-bottoms before it is deposited on said table, a second reciprocable table at a subsequent station, stripping mechanism at a still subsequent station, and means for actuating said wall-forming mechanism and said glue applying mechanism and for reciprocating said tables and operating said carrier-moving means, all in timed relationship.

4. In a box-forming machine, a rotatable carrier, an annular series of box-forms mounted on said carrier, means for rotating said carrier intermittently to bring said forms successively to each of a series of stations, mechanism at one of said stations for wrapping about the form thereat a flexible wall-forming strip having along its lower edge a series of tabs, a reciprocable table at a subsequent station for forcing against said tabs a box-bottom to be glued thereto, and a stationary supporting member disposed above the form at said subsequent station in a position to prevent upward deformation of said carrier from the pressure exerted by said table.

5. In a box-forming machine, a box-form, a carriage movable in a plane parallel to said form, a wall-forming member movably supported from said carriage to pass along at least one side of said form as the carriage moves and to force against the side of the form a flexible wall-forming strip having a spaced series of tabs along its lower edge, said wall-forming member having a flange positioned to engage said tabs and force them successively against the lower surface of said form.

6. In a box-making machine, a horizontally disposed form for the side walls of a box, a carriage horizontally reciprocable toward and away from said form, two arms pivotally mounted on said carriage and having at their free ends wall-forming members adapted to engage a strip of flexible material and bend it in a horizontal plane into contact with opposite sides of said form as said carriage moves theretoward, said arms being respectively provided below the wall-engaging portions of said members with outwardly projecting flanges for supporting the strip of flexible material during the bending operation, and yielding means acting between said arms for forcing said members toward each other.

7. In a box-making machine, a horizontally disposed form for the side walls of a box, a carriage horizontally reciprocable toward and away from said form, two arms pivotally mounted on said carriage and having at their free ends wall-forming members adapted to engage a strip of flexible material and bend it in a horizontal plane into contact with opposite sides of said form as said carriage moves theretoward, said arms being respectively provided below the wall-engaging portions of said members with outwardly projecting flanges for supporting the strip of flexible material during the bending operation, and yielding means for forcing said members toward each other.

8. In a box-making machine, a form for the side walls of a box, a carriage reciprocable toward and away from said form in a plane parallel to the plane of the form, two arms pivotally mounted on said carriage and having at their free ends wall-forming members mounted in fixed position on the respective arms and adapted to engage a strip of flexible material and bend it into contact with opposite sides of said form to form the side walls of a box as said carriage moves theretoward, and yielding means for forcing said members toward each other, said wall-forming members being so disposed on their respective arms that one will move inwardly across the rear face of said form more rapidly than will the other as the carriage approaches the end of its movement toward the form.

9. In a box-making machine, a form for the side walls of a box, a carriage reciprocable toward and away from said form in a plane parallel to the plane of the form, two arms pivotally mounted on said carriage and having at their free ends wall-forming members adapted to engage a strip of flexible material and bend it into contact with opposite sides of said form to form the side walls of a box as said carrier moves theretoward, yielding means for forcing said members toward each other, means for limiting inward movement of the side-wall forming members when they are co-operating with the rear face of the form, and mechanism acting on said wall-forming strip between said members for successively disposing the ends of the wall-forming strip in overlapping relation against the rear face of the form, said mechanism including a part movable toward and away from the rear face of said form and carrying two elements respectively engageable with the ends of said strip, one of said elements being disposed in advance of the other and being yieldingly mounted in said part.

10. In a box-making machine, a form for the side walls of a box, a carriage reciprocable toward and away from said form in a plane parallel to the plane of the form, two arms pivotally mounted on said carriage and having at their free ends wall-forming members adapted to engage a strip of flexible material and bend it into contact with opposite sides of said form to form the side walls of a box as said carriage moves theretoward, yielding means for forcing said members toward each other, means for limiting inward movement of the side-wall forming members when they are co-operating with the rear face of the form, and mechanism acting on said wall-forming strip between said members for successively disposing the ends of the wall-forming strip in overlapping relation against the rear face of the form, said mechanism including a part movable toward and away from the rear face of said form and carrying two elements respectively engageable with the ends of said strip.

11. In a box-making machine, a form for the side walls of a box, a carriage reciprocable toward and away from said form in a plane parallel to the plane of the form, two arms pivotally mounted on said carriage and having at their free ends wall-forming members adapted to engage a strip of flexible material and bend it into contact with opposite sides of said form to form the side walls of a box as said carriage moves theretoward, and yielding means for forcing said members toward each other, said wall-forming members being independently adjustable longitudinally of the respective arms to any of various fixed positions.

12. The invention set forth in claim 8 with the addition of an auxiliary member mounted on the arm carrying the wall-forming member which moves inwardly the more rapidly across the rear face of said form, said auxiliary member being positioned to engage said strip at the side of the form as the wall-forming member on such arm reaches the extreme rear face of the form.

13. In a box-making machine, a form for the side walls of a box, a movable carrier to which said form is affixed, a carriage reciprocable toward and away from said form in a plane parallel to the plane of the form, two arms pivotally mounted on said carriage for swinging movement in respective planes parallel to but displaced from the plane of the form, said arms being respectively provided at their free ends with wall-forming members projecting from the plane of the arms into the plane of the form and adapted to engage a strip of flexible material and bend it into contact with opposite sides of said form to form the side walls of a box as said carriage moves theretoward, and yielding means for forcing said members toward each other.

JAMES BOYD THAXTON.